…

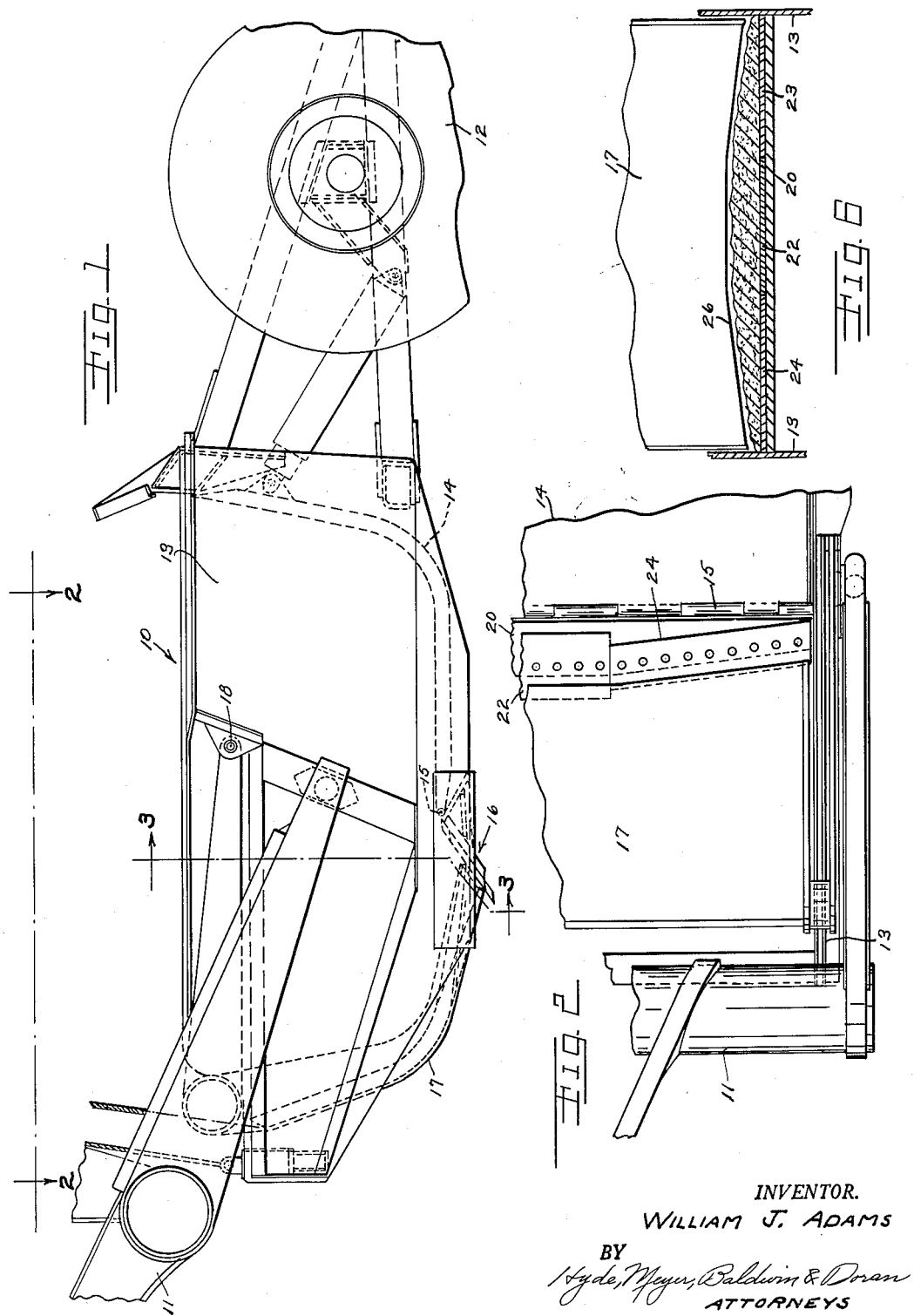

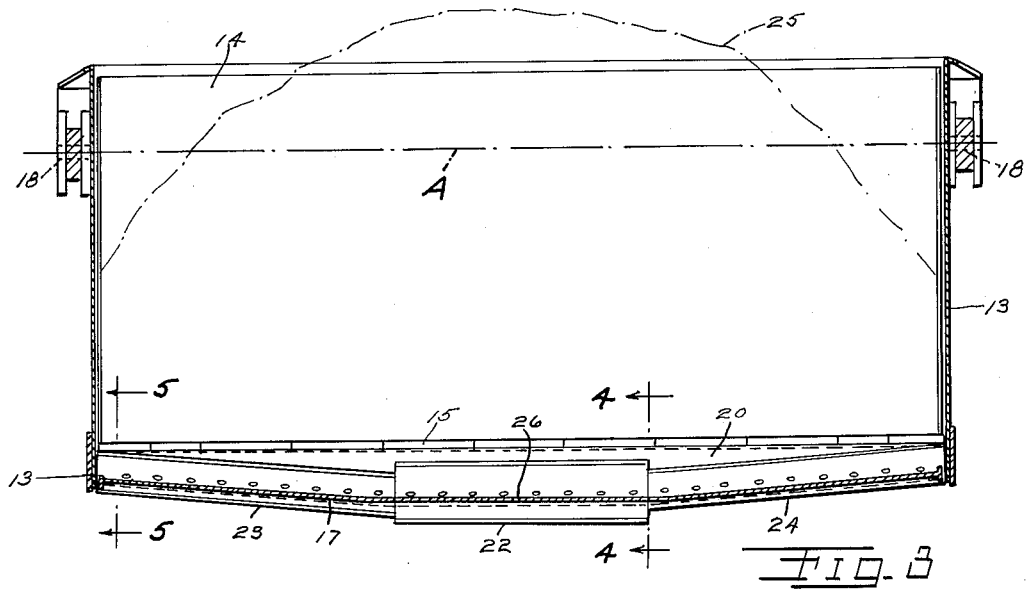
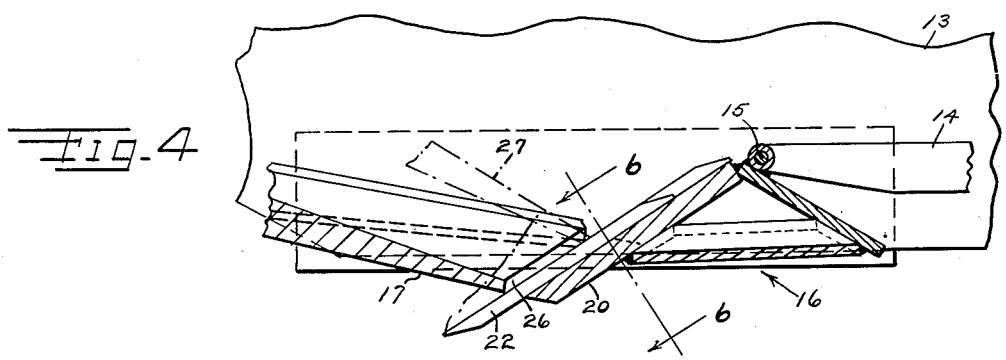
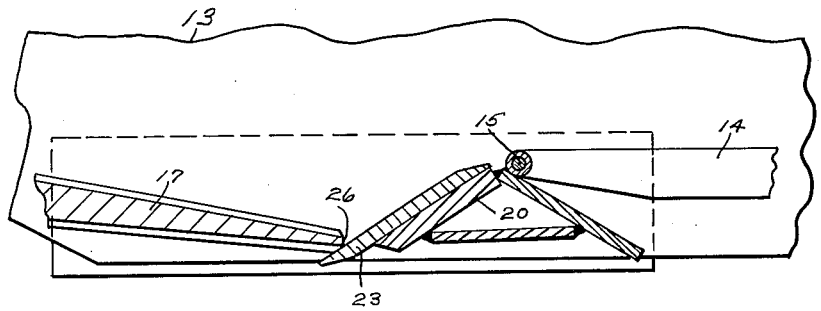

United States Patent Office 2,729,001
Patented Jan. 3, 1956

2,729,001

TAPERED CUTTING EDGE FOR DIGGING AND CARRYING SCRAPER AND ASSOCIATED APRON

William J. Adams, Santa Cruz, Calif., assignor, by mesne assignments, to General Motors Corporation, Detroit, Mich., a corporation of Delaware Application August 14, 1951, Serial No. 241,745

1 Claim. (Cl. 37—141)

This invention relates to improvements in cutting edges and cutters and more particularly to a tapered cutting edge for a digging and carrying scraper.

One of the objects of the present invention is to provide in a scraper of the type described a cutter adapted to cut more easily in hard soil and to form a better heaped center load in said scraper.

Another object of the present invention is to provide in a scraper of the type described a coacting cutter and apron to provide a larger throat capacity for the cutter, a closer seal between the cutter and the apron, and an easier closing action for the apron when it bites away the material on the cutter.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view of the digging and carrying scraper having the novel cutter and apron of this invention;

Fig. 2 is an enlarged fragmental top view of Fig. 1 taken along the line 2—2 of Fig. 1;

Fig. 3 is an enlarged sectional view taken along the line 3—3 of Fig. 1 and showing a heaped center load in dot-dash line in the scraper bowl;

Fig. 4 is an enlarged vertical sectional view taken along the line 4—4 of Fig. 3 with the conventional apron lip and the dirt depth on the cutter shown in dot-dash lines;

Fig. 5 is an enlarged vertical sectional view taken along the line 5—5 of Fig. 3; while Fig. 6 is a reduced sectional view taken along the line 6—6 of Fig. 4 with the apron elevated and earth being cut.

While the novel type cutter and apron of this invention might be adapted to various types of machines, I have chosen to show the same as applied to a digging and carrying scraper described and claimed in the copending U. S. patent application of William J. Adams entitled "Scraper," Serial No. 111,496, filed August 20, 1949, now Patent No. 2,674,815. The scraper, generally indicated at 10, is of the conventional type of digging and carrying scraper and is fully disclosed in said patent application. The pull yoke 11 pivotally attached to the scraper is mounted by a pivotal hitch to the prime mover or tractor which pulls the scraper and supports the front end of the scraper. Rear wheels 12 support the rear end of the scraper. The transportable scraper bowl, mounted between the rear wheels 12 and the tractor, has side walls to retain the dirt or other scraper load and is open at its forward end. An ejector 14 pivoted at 15 in the bowl 13 oscillates in a counter-clockwise direction (Fig. 1) to discharge the contents of the bowl. The cutter, generally indicated at 16, is located on the bottom of the bowl in front of or ahead of the pivot point 15. Apron 17 at the front of the bowl is pivoted to the bowl side walls at pivot points 18 to close the open front end of the scraper bowl. These are the basic elements of the conventional digging and carrying scraper. This invention relates to the shape of the cutter 16 and the coacting lip of apron 17.

The cutter 16 wil now be described. The cutter has a cutter base 20 attached to the opposite side walls of the bowl and to a zone near the ejector pivot axis 15 to form a rigid structure. A cutting blade is attached to this cutter base and has a tapered form. This cutting blade can, of course, be a one-piece, integral blade or can be made up of a series of blade sections. The latter form has been chosen to be illustrated in the drawings of this application and has novel features as defined in the claims.

The cutting blade in Fig. 3 consists of a center blade section 22 and two end blade sections 23 and 24. The center blade section 22 has a forward cutting edge or leading edge which extends perpendicular to the general direction of cutter movement when loading the scraper. It has a rectangular, double-edged blade formation. This center blade section 22 is attached to the cutter base 20 by bolts or any other type fastening means desired. Since the blade section 22 is double-edged and rectangular, it may readily be turned over on the cutter base 20 and then clamped in position so as to present the other parallel cutting edge and to give added wear life.

The end blade sections 23 and 24 are each contiguous to and abut an end of the center blade section. The end blade sections are identical in shape. Each end blade section has a forward cutting edge or leading edge that is outwardly and rearwardly and upwardly inclined with respect to the general direction of travel of the cutting blade. Each end blade section is of identical rhomboid shape, double-edged on their longer sides and removably mounted on the cutter base 20. This removable mounting takes the form of bolts in the drawings but any other type of mountings desired can be used. Since the end blade sections are identical in shape they may be interchanged or turned end for end on the cutter base 20 so that all four cutting edges of the two end blade sections can be used. Hence, the double-edged blade sections 23 and 24, being of similar shape, have long cutting edge life. Although the drawings illustrate each end blade section of a rhomboid shape having no right angles, the end blade sections may be rectangular in formation if the abutting ends of the center blade section 22 converge slightly rearwardly. In this case, the center blade section would not be reversible but the end blade sections would be reversible.

The drawing discloses the center blade section 22 and the two end blade sections 23 and 24 to be coplanar. The cutting blade or blade sections are downwardly and forwardly inclined relative to the general direction of cutter movement or digging motion. In Fig. 1, the cutter and the digging and carrying scraper move toward the left. When the blade sections are coplanar and in the position shown in Fig. 2, definite relationships exist between the cutting angle and the shape of the end blade sections. The angle between the leading edge of an end blade section and the adjacent edge abutting the center blade section is complementary to the cutting angle between the leading or forward cutting edge of the end blade section and a line parallel to the leading edge of the center blade section. This angle is measured in the common plane of the blade sections 22, 23 and 24. Also, when these blade sections are co-planar (as illustrated), the tapered cutting edges of the cutting blade or blade sections 23 and 24 converge toward the leading edge of the blade formed by the cutting edge on blade section 22. It might also be said that these tapered cutting edges on sections 23 and 24 are outwardly and upwardly inclined from the leading edge of the center blade section 22.

This tapered cutting blade formation has several advantages. First, the cutting blade in Fig. 3 tends to form a better heaped center load in the scraper bowl. The upwardly inclined center blade section 22 cuts, since it is lower than the other blade sections, a thicker slab of material than the upwardly inclined end sections 23 and 24 since its cutting edge extends downwardly below those of sections 23 and 24. This thicker slab of cut material in the center of the bowl will tend to heap up and form a better heaped center load as shown as 25 in Fig. 3 by the dot-dash lines. The load will not be jammed against the sides and any of the load rolling off the heaped center will roll gently down against the sides of the bowl instead of being jammed against them. Since the load is not so tightly packed or jammed against the sides, a pivoted ejector 14 can easily dump or eject a load. Second, the upwardly tapered cutting edges of sections 23 and 24 with the low center portion of the cutting edge on section 22 permit the taking of a narrower cut than the straight-across cutting blade of the conventional scraper when the depth of cut is not great enough to require the full length of the cutting edges of sections 23, 24. A deeper cut can be also taken, if desired, since the tapered cutting blade design and the narrower cut insure a larger cutting force per inch of cutting width than the conventional cutting blade.

The apron 17 is pivotally mounted at 18, 18 at the front of the scraper bowl 13. The lower lip 26 of the apron substantially conforms in shape to the cutting edges, as seen in Figs. 2 and 3, and is adapted to contact the cutting blade sections along the full width of the bowl and close behind the blade cutting edges. The apron lip 26 is substantially parallel to the cutting edges, as seen in Fig. 3, when the lip and blade contact. The blade contacting edge of the lip 26 lies all in one plane.

The shape of this apron lip has many advantages. First, the lip 26 provdes a closer seal with the blade to prevent the escape of the load from the scraper bowl. Second, the shape of the lip provides a larger throat opening when the apron 17 is lifted during the cutting operation. This larger throat opening is over the center blade section 22 where it is most needed since the center blade section takes the thickest or the deepest cut. This larger throat opening results from a difference in radius between the apron pivot points 18, 18 and different points on the apron lip 26. This relationship is most clearly shown in Fig. 3, where the axis of pivot points 18, 18 is indicated by a dot-dash line A. The portion of lip 26 in contact with the center blade section 22 is a greater distance from axis A than the portion of the lip 26 in contact with the outer edge of end blade sections 23 and 24. The portion of the lip with the larger radius moves a greater distance for a given angular displacement of the apron, and hence, a larger throat opening exists adjacent this portion of the lip, as seen in Fig. 6. Third, the conforming lip 26 of the apron makes it easier to close the apron when the cutting blade is lifted out of the cut. It does not have to bite away as much earth or material on the cutting blade as the conventional apron lip. In Fig. 4 of the drawings, the contour of the previously cut earth is shown lying on the cutting blade as the cutting blade is lifted out of the cut. (The conventional, straight-across apron lip is shown at 27 by the dot-dash lines.) In order for this straight apron lip to prevent the escape of dirt from the outer ends of the end blade sections 23 and 24, the apron lip 27 must contact the center blade section 22 a considerable distance back from the leading cutting edge. The apron lip 27 of the conventional type must then bite through a thicker amount of earth resting on the center blade section, as shown in Fig. 4. This added resistance may prevent the apron from closing. With the novel apron lip 26 of this invention, this difficulty does not exist since the apron lip 26 engages the center blade section 22 fairly close to the leading cutting edge and does not have to bite away very much of the earth remaining on the cutting blade.

Some of the advantages of this invention are realized if the whole blade is not co-planar as long as the apron lip matches the cutting blade in a similar manner to that set forth above, and if because the distal ends of the cutting blade are adapted to create a heaped center load the blade is upwardly inclined from the center portion of the blade. In other words, in its broadest aspect, my invention contemplates a cutter blade which takes a deeper cut at the center, combined with an apron lip which closely conforms to the contour of such blade close behind the leading edge thereof.

What I claim is:

In a digging and carrying scraper, a scraper bowl open at its forward end and having a cutter blade mounting base behind said open end, a rectangular center blade section and two rhomboid end blade sections, one on each side of said center blade section, all of said blade sections lying in a common plane, each of said blade sections having leading and trailing cutting edges, a line of spaced bolt holes in each section extending parallel to one of its associated cutting edges for detachably mounting said section on said base, the leading cutting edge of said center blade section extending perpendicular to the direction of movement and each of said end sections extending laterally outwardly and upwardly and rearwardly with respect to digging motion of said scraper, and the forward internal angle of each said rhomboid end section at the end abutting said center section being complementary to the angle between the leading edge of said end section and a line parallel to the leading edge of said center section, said angles being measured in said common plane, whereby said blade sections may be reoriented on said base so that the trailing cutting edges may be used, the center portion of said blade adapted to make a deeper cut than the end portions thereof, an apron pivotally mounted on said bowl about an axis generally parallel to the leading cutting edge of said center blade section for opening or closing said open end, said apron having a lip having portions thereof oriented similarly to the leading cutting edges of said sections and adapted to engage said sections in closed position, the lip portion engageable with said center section being located farther from said pivotal axis than the lip portions engageable with said end blade sections, said lip and cutting edge construction preventing escape of the bowl contents in the closed position, providing a larger throat opening over the center blade section than over the end sections, and providing easy apron closing when the bowl is loaded.

References Cited in the file of this patent

UNITED STATES PATENTS

| | | |
|---|---|---|
| 1,333,816 | Mossman | Mar. 16, 1920 |
| 2,083,307 | Schultz | June 8, 1937 |
| 2,154,503 | French et al. | Apr. 18, 1939 |
| 2,260,388 | Le Bleu | Oct. 28, 1941 |
| 2,304,786 | Armington et al. | Dec. 15, 1942 |
| 2,329,831 | Ferguson | Sept. 21, 1943 |
| 2,349,576 | Daniels | May 23, 1944 |